United States Patent [19]

Mackenzie

[11] E Re. 28,980

[45] Reissued Sept. 28, 1976

[54] DISCRETE MATERIAL TRANSPORTING AND DUMPING APPARATUS AND METHOD

[76] Inventor: Harold B. Mackenzie, 330 Naperville Road, Wheaton, Ill. 60187

[22] Filed: Jan. 22, 1975

[21] Appl. No.: 543,188

Related U.S. Patent Documents

Reissue of:

[64] Patent No.: 3,720,328
Issued: Mar. 13, 1973
Appl. No.: 114,005
Filed: Feb. 9, 1971

[52] U.S. Cl. ..... 214/38 D; 214/152
[51] Int. Cl.[2] ..... B65G 67/02
[58] Field of Search ..... 214/38 D, 17 D, 82, 214/310, 152; 100/229 A; 222/326, 327; 220/93

[56] References Cited

UNITED STATES PATENTS

| | | | |
|---|---|---|---|
| 1,015,397 | 1/1912 | Posson | 105/377 |
| 1,268,654 | 6/1918 | White et al. | 222/326 |
| 2,627,987 | 2/1953 | Northeim | 214/82 X |
| 2,691,450 | 10/1954 | Rosenbaum | 214/38 D |
| 2,726,776 | 12/1955 | Myers | 214/82 |
| 2,863,580 | 12/1958 | Kamin | 214/82 X |
| 3,071,264 | 1/1963 | Totaro et al. | 214/82 |
| 3,658,213 | 4/1972 | Plumer | 222/326 |

*Primary Examiner*—Robert G. Sheridan
*Attorney, Agent, or Firm*—Hill, Gross, Simpson, Van Santen, Steadman, Chiara & Simpson

[57] ABSTRACT

Discrete material transporting and dumping apparatus and method involve a container having an open top closed by hopper doors, a normally closed rear end through which, when open, contents of the container are adapted to be dumped by a pusher structure in the container chamber activated rearwardly by conveyance motivated means such as a hydraulic piston, a drive screw or a cable the end of which is accessible when the rear doors are opened for connection to a transporting conveyance-carried winch cable. The pusher structure is returned to the front end of the container after the dumping operation. The conveyance is adapted to be a flatbed truck trailer having tracks thereon receptive of bottom rollers on the container, whereby the container is adapted to be brought adjacent to a dump site on a railroad flatcar, transferred to the trailer, taken to the dump site, the pusher structure operated to unload the container, and the container then returned to the railroad car. The pusher may serve as a compacting ram.

22 Claims, 10 Drawing Figures

DISCRETE MATERIAL TRANSPORTING AND DUMPING APPARATUS AND METHOD

Matter enclosed in heavy brackets [ ] appears in the original patent but forms no part of this reissue specification; matter printed in italics indicates the additions made by reissue.

This invention relates to the art of transporting and dumping discrete material, and more particularly concerns a new and improved apparatus for and method of handling solid waste refuse material, which may or may not be compacted, from a loading site to a receiving site such as a land fill dump.

Various arrangements have heretofore been proposed for transporting and dumping discrete solids but have generally involved more expensive equipment such as individual dump trucks or similar conveyances in which a full individual and exclusive power plant is required and the truck must be operated from the source to the dump site. Other arrangements utilize containers that must be tilted or inverted for dumping. Such containers are limited as to size and therefore load that can be handled. Tip-unloading of containrs or dump trucks requires relatively solid level footing for the vehicle. However, in land fill operations efficiency requires that there be many lifts. Each lift is covered with loose dirt for controlling odors and vermin. Therefore, as filling progresses there are successive layers of refuse and earth with virtual certainty that there will be soft spots and unevenesses in the filled surface.

Rail haul containers must be as wide and high as permitted by the maximum dimensions of the railroad to afford the maximum payload possible. Similarly in respect to highway transport, as large a payload as possible must be provided for if the project is to be economically feasible. Where large containers are used, a top-heavy condition can easily arise due to the weight of the container plus the weight of the load, giving a rather high center of gravity, thus over-center toppling of the vehicle and container is an ever-present danger in the tip-unloading or gravity discharge arrangements, namely, where the container must be tilted to dump the load. Further, in such unloading onto a generally horizontal surface, after the load is partially discharged, material being unloaded tends to jam the container discharge opening and requires jiggling or moving the vehicle to permit complete unloading, thus increasing the danger of toppling.

According to the present invention the foregoing and other disadvantages, shortcomings, difficulties, inefficiencies and problems are overcome by providing a new and improved container and method of handling and unloading it generally horizontally.

An important object of the present invention is to provide a new and improved apparatus for and method of discrete material transporting and dumping.

Another object is to provide new and improved container structure for discrete material transporting and dumping, and which is adapted for efficient reception of material to be transported and is constructed and arranged for efficient, economical transportation and handling for the intended purpose.

A further object of the invention is to provide new and improved method of and means for transporting large capacity discrete material transporting and dumping containers to and between loading and dumping sites.

Still another object of the invention is to provide new and improved method of and means for compacting material in and dumping material from a large capacity transporting container.

Yet another object of the invention is to provide new and improved transporting vehicle-carried motivating means for an unloading pusher or ram structure of a large-capacity discrete material transporting container.

A still further object of the invention is to provide new and improved apparatus for and method of land fill waste disposal.

Other objects, features and advantages of the invention will be readily apparent from the following description of certain preferred embodiments thereof, taken in conjunction with the accompanying drawings, although variations and modifications may be effected without departing from the spirit and scope of the novel concepts embodied in the disclosure, and in which.

Figures 1, 2, 3, 4:
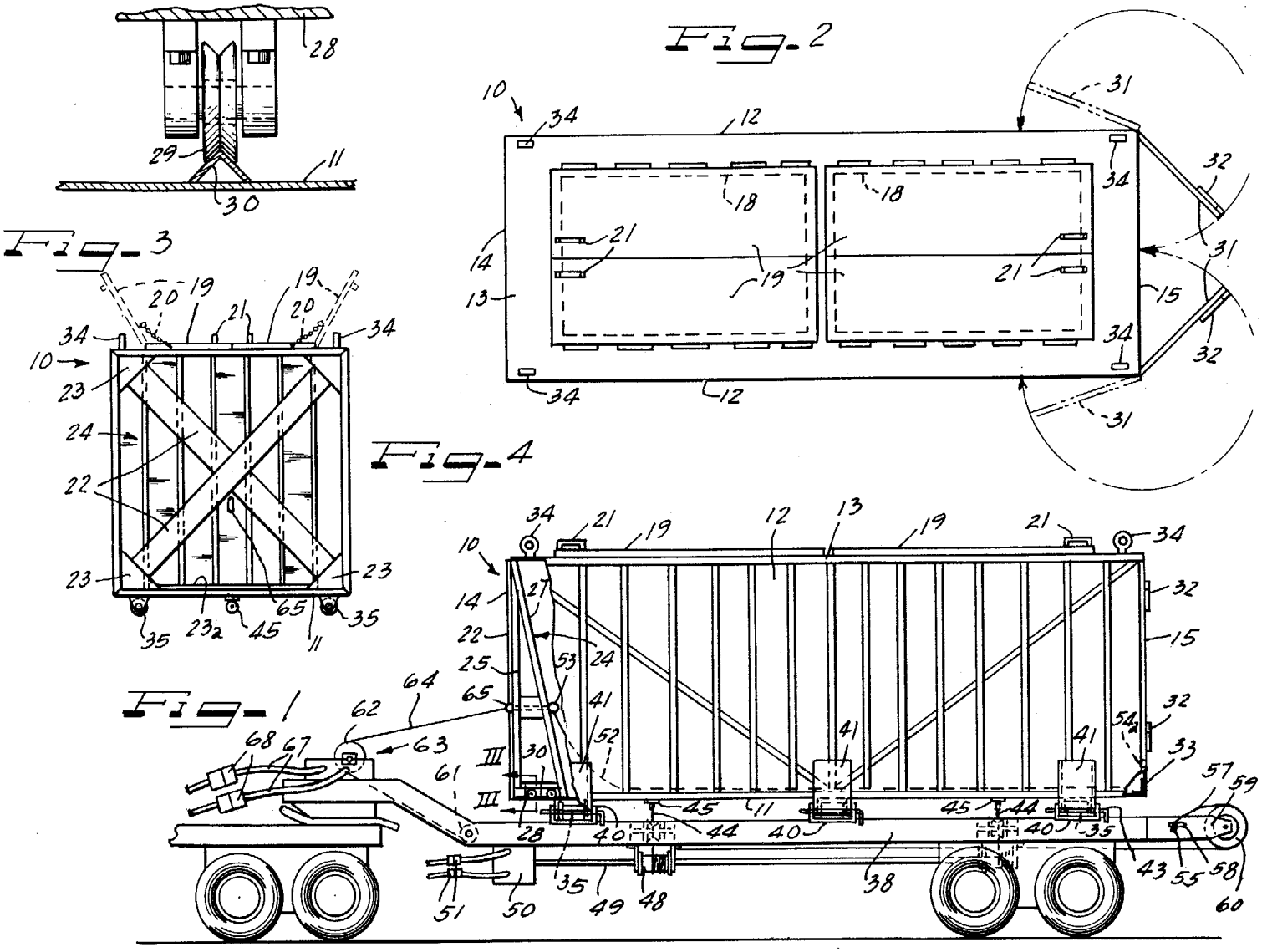
FIG. 1 is a side elevational view of a large capacity discrete material transporting and dumping container and a conveyance therefor.
FIG. 2 is a top plan view of the container.
FIG. 3 is an enlarged fragmentary vertical sectional detail view taken substantially along the III-III of FIG. 1.
FIG. 4 is a front end elevational view of the container.
Figure 5:
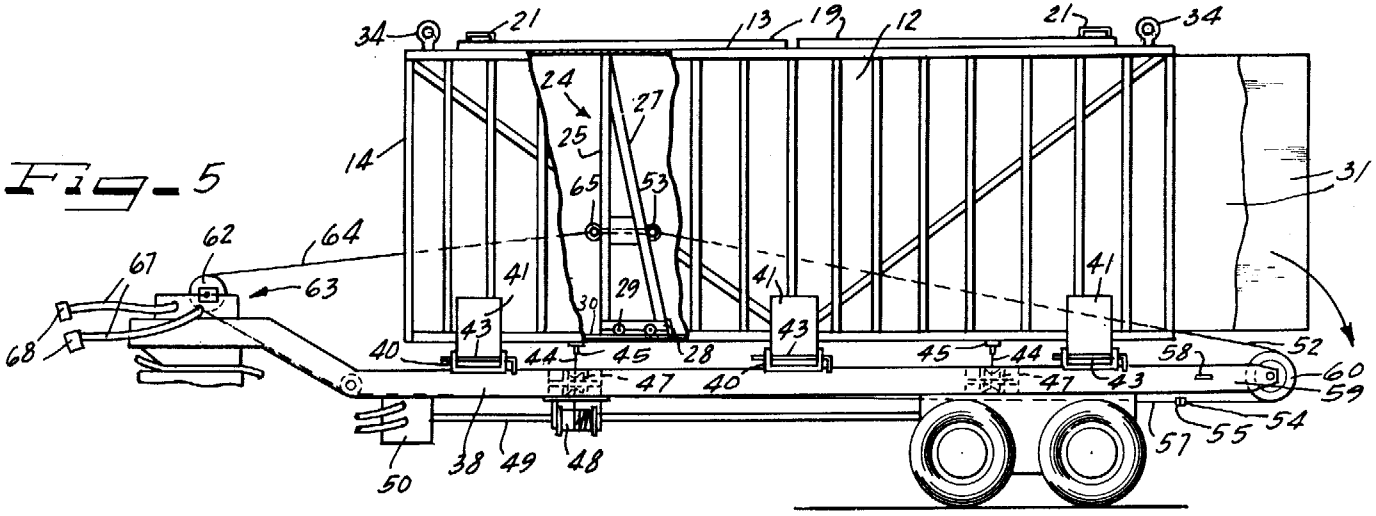
FIG. 5 is a side elevational view similar to FIG. 1 but showing the pusher partially advanced in a dumping operation.
Figure 6:
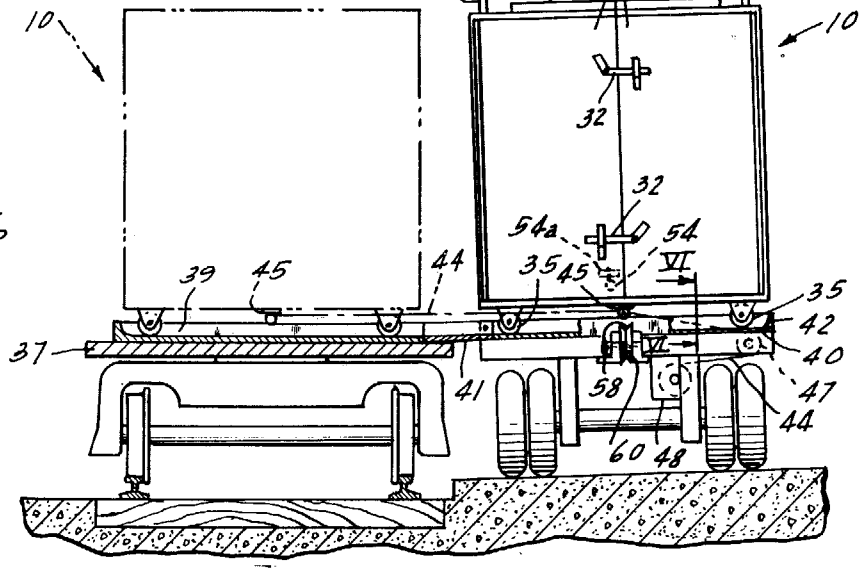
FIG. 6 is a rear end elevational view of the assembly of FIG. 1 showing the same at a railroad track-side transfer.

In a typical example of apparatus according to the present invention, a large capacity container 10 (FIGS. 1–5) is provided having a bottom wall 11 with opposite coextensive spaced side walls 12 rising therefrom, a top wall 13, a front end 14 and a rear end 15. Within the container is thus defined a discrete material-receiving chamber 17. Material is adapted to be filled into the chamber 17 through at least one and preferably two filling openings 18 which occupy the major area of the top wall 13 and are closed by respective pairs of hinged complementary doors 19 adapted to be swung open into hopper relation to the opening as shown in FIG. 4 and retained in that position by means such as chains 20 until reclosed. To facilitate manipulation, each of the doors may be provided with a suitable handle 21.

At its front end 14, the container 10 may be open and provided with reinforcing frame structure 22 (FIG. 4) such as a generally X-shaped structure rigidly connecting the corners of the bottom, side and top wall quadrangle through respective gusset plates 23. Inside the frame 22 the front end of the container is normally closed by a movable quadrangular bulkhead 24 adapted to serve as a contents-dumping ram or pusher structure, as well as a compactor if desired. In an efficient, rigid construction, the pusher bulkhead 24 comprises a vertical front or outer side frame 25 and a rearwardly facing plate 27 desirably extending diagonally downwardly and forwardly from the upper edge of the frame 25 and jointed at its bottom edge to the bottom edge of the frame by means of an integral dolly 28 having rollers 29 which may be generally V-grooved (FIG. 3) to run on complementary inverted V-shaped angle iron rails 30 extending longitudinally along the inner surface of the bottom wall 11 to and between the opposite ends of the container. Thereby, the bulkhead pusher 24 is adapted to be reciprocably actuated to move forwardly and rearwardly in the chamber 17. Material of the contents within the chamber 17 is prevented from escaping forwardly past the front face provided by the panel 27 by having the panel edges close to the bottom, side and top walls, and preferably provided with suitable scraping gasket means engaging the inner surfaces of those walls.

Normally the rear end 15 of the container is closed by door means, desirably comprising a pair of complementary doors 31 vertically hinged to the rear ends of the side walls 12 (FIGS. 2 and 5) and adapted to be latched in normally closed position by means of releasable latches 32. In the closed condition of the doors 31, liquids that may drain from container contents are prevented from leaking out along the lower edges of the doors by suitable retaining means such as a flexible gasket member 33 (FIG. 1) intermediately hinged along a horizontal line with a base portion secured to the bottom wall 11 adjacent to the rear opening. A portion of the member 33 extends upwardly along the inside of the lower margin of the doors 31 in closed condition but is swingable downwardly and outwardly when the doors are opened for dumping the container contents. Along the sides of the floor surface provided by the bottom wall 11, the side wall juncture prevents leakage. A retainer and reinforcing bar 23a (FIG. 4) along the front end of the bottom wall 11 prevents forward leakage of any liquid that may escape forwardly past the movable bulkhead ram pusher 24.

According to the present invention, the container 10 is arranged to be transported conveniently between a loading site or collection point *and a dumping site* by means of a selective variety of conveyances while remaining at all times substantially horizontal. For this purpose, the container is constructed to be portable and transferable to and between different conveyances. Hoisting may be employed for the purpose, and to this end the container has means such as lifting eyes 34 adjacent to the respective corners of the top wall 13 engageable by hoisting cable or chain hooks.

Another and preferred manner of transfer from one conveyance to another or from a loading dock to a conveyance and return to loading dock comprises wheeling the container. For this purpose it is desirably provided with casters or rollers 35 at suitable locations on the underside of the lower wall 11 such as adjacent to the side walls 12 and especially suitable for rolling or wheeling the container in either lateral direction, that is in direction normal to the side walls 12. For example, in refuse disposal a plurality of loaded containers 10 may be transported on railway flatcars such as the flatcar 37 represented in FIG. 5 to a siding where one or more conveyances such as tractor truck trailers 38 may be brought into alignment alongside the flatcars to receive the containers 10 one-by-one therefrom. A plurality of the trailers 38 may be serviced successively or alternately by one or more automotive tractors for most economical use of the tractors and drivers.

To facilitate transportation, and transfer from one conveyance to the other, the railway flatcars 37 may be provided with transverse upwardly opening channel guide tracks 39 with which corresponding transverse upwardly opening channel guide tracks 40 on the respective trailer beds are adapted to be aligned. Respective bridging or ramp means such as transfer ramps 41 bridge between and across any gap that may be present between the adjacent ends of the tracks such that the rollers 35 of one of the containers 10 may run onto and between the tracks either from the flatcar 37 onto the trailer or from the trailer onto the flatcar, as the case may be. After the container 10 has been transferred to either of the conveyances, the container rolling gear is [clocked] *chocked* against escape from the respective tracks. For example, at one side of the trailer 38 the ends of the tracks 40 are provided with respective stops 42, while at the opposite ends, the ramps 41 may be hingedly secured to the tracks 40 and after the loaded container 10 has been transferred to the trailer 38 the ramps 41 are adapted to be swung up as shown in FIG. 1 into locking relation to those ends of the tracks, and latched in the locking position by suitable means such as respective tethered pins 43 extending between the sides of the track channels outwardly along the lockingly disposed ramp members. Thereby the container 10 is held against unintentional transverse displacement from the bed of the trailer 38, and the side wall flanges of the track channels 40 cooperate with the rollers 35 to retain the container 10 against longitudinal displacement. Any suitable chocks or locking devices may be employed to retain the containers against unintentional displacement from the flatcars.

Transfer of the loaded containers from the flatcars to the trailers, and subsequent return of the empty trailers to the flatcars is facilitated by a preferably slightly tilted relation of the roadbed for the trailers toward the loading dock or siding position of the flatcars 37, such that controlled, powered shifting of the loaded containers up the slight incline onto the trailers is feasible and controlled gravity rolling of the empty containers onto the flatcars is provided for. While the flatcars may be equipped with thrusting means to effect shifting of the loaded containers and possibly serving also to control rolling gravity transfer of the containers onto the flatcars, an effective arrangement comprises equipping the trailers 38 with such means. For this purpose, each of the trailers 38 may be provided with one or more, herein shown as two transfer shifting cables 44 (FIGS. 1 and 5) detachably connectable to respective anchoring devices such as suitable respective eyes 45 on the bottom wall 11 of the container. On the trailer 38, the transfer cables 44 are trained over respective pulleys 47 mounted on the side of the frame of the trailer bed opposite to the side from which the container is to be transferred onto or transferred from the trailer. At their ends opposite the container-engaging ends thereof, the cables 44 are engaged upon respective winch drums 48 suitable mounted under the bed of the trailer and either individually driven in unison, but preferably operable in unison through the medium of a common shaft 49 coupled at one end to a motor 50, in this instance also mounted on the trailer and equipped to derive power from the associated tractor. For this purpose the motor 50 may be a hydraulic motor connectable through quick disconnectable couplings 51 with hydraulic lines integrated with a hydraulic system including a suitable pump, in known manner on the tractor. Through this arrangement, when the trailer 10 is to be transferred from the railway flatcar 37, the cables 44 are paid out over the pulleys 47 and attached to the anchoring devices 45 of the container. Then the winch drums 48 are operatively driven to shift the container from the flatcar toward the trailer, to run from the flatcar tracks 39 across the bridging ramps 41 onto the trailer tracks 40, thereupon, either retaining the container on the trailer up against the stops 42 by means of the cables 44, or alternatively or in addition locking the opposite side of the container against escape from the tracks by means of the ramp extensions serving as locking stops. When the empty container 10 is to be returned to the railway flatcar, it can be gravitationally returned across the extended ramps 41 onto the tracks 39 by controlled paying out of the transfer cables 44, the weight of the container 10 being sufficient for this purpose where there is a slight incline of the trailer bed toward the flatcar bed.

On the conveyance 38 the loaded container 10 is transported to a dump site where the rear doors 31 are opened and the container contents dumped while the container remains in a generally horizontal position on the conveyance, thereby maintaining the center of gravity well forwardly from the rear end of the conveyance and as low as possible as is highly desirable where the dump site is a land fill operation and the terrain may be relatively soft or at last have soft spots, particularly in the area where the rear wheels of the conveyance 38 must stand during the dumping procedure.

To effect dumping and discharge of the container contents, the bulkhead pusher 24 is moved rearwardly as a discharge ram. For this purpose, a cable 52 may be permanently secured by means of an anchor device 53 to the rear face plate 27 of the pusher and has a quick-release coupling device 54 at its other end which in the fully forwardly retracted position of the pusher is readily accessible through the open rear end 15 of the container to be unhooked from a storage bracket 54a conveniently on the inside of one of the doors 31. Thereby, connection of the coupling device 54 with a complementary coupling device 55 on a discharge pull cable 57 is facilitated. In non-use the coupling end of the cable 57 is adapted to be held in position by a retainer 58 on a rearward rigid short cantilever extension 59 from the bed of the conveyance 38 carrying an idler pulley 60 over which the cable is trained to pass forwardly under the conveyance bed, past a front end idler pulley 61 to a drum 62 of a cable winch assembly 63 mounted on the conveyance forwardly from the conveyance bed. By operating the winch 63 after the cables 52 and 57 have been coupled, the pusher 24 is pulled rearwardly (FIG. 5) and rams the container contents out through the open rear end 15. As the pusher moves rearwardly, a pusher-returning cable 64 disconnectably anchored through a suitable device 65 to the front frame 25 of the pusher is paid out by the winch 63. Thereby, after the pusher 24 has reached its rear limit where all of the container contents have been discharged, the winch 63 is reversed and the return cable 64 reeled in to pull the pusher back to its forward limit position, while the cable 57 is correspondingly paid out until the coupling end of the pusher-anchored cable 52 is returned to its idle position where its coupling device 54 is disconnected from the coupling device 55 and the rear end of the cable 57 is engaged with the retainer 58. Also, the cable 64 is disconnected from the device 65, the pusher is suitably secured in its forward position, the container is now ready to be transferred to the rail car and returned to the collection site or source of discrete material for refilling. Operation of the winch 63 may be in any suitable manner, such, for example, as by hydraulic means through hydraulic ducts 67 connectable by quick disconnect hydraulic couplings 68 to a hydraulic power system carried by and operated from the automotive tractor.

Figure 7:
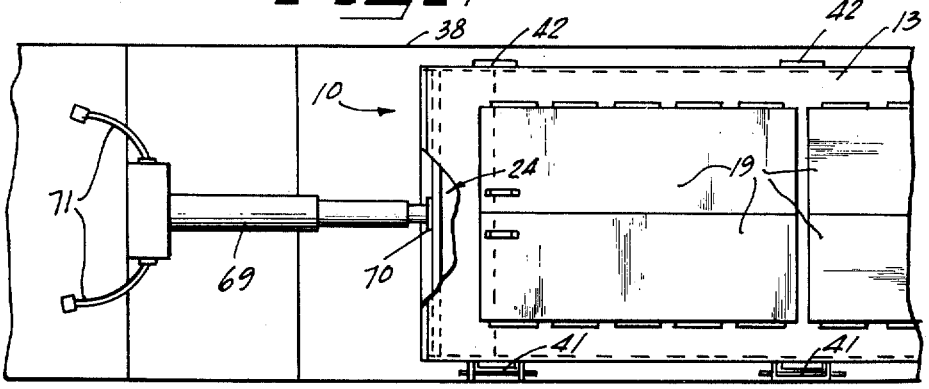
FIG. 7 is a fragmentary top plan view disclosing hydraulic plunger actuation of the bulkhead ram of the container.
Figure 8:
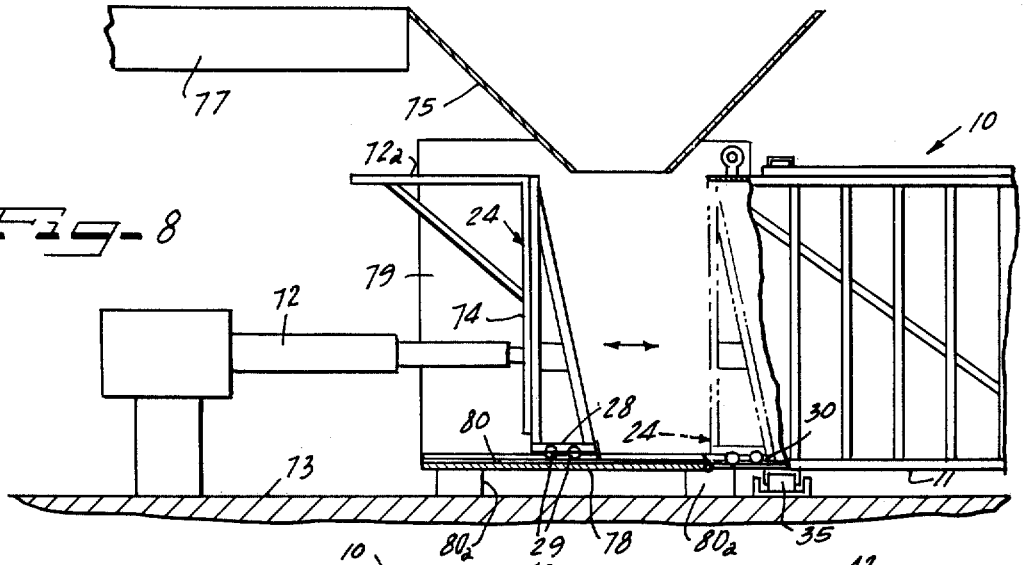
FIG. 8 is a fragmentary side elevational view illustrating a dock at which containers are filled with material and including a ram-driving plunger arrangement.

Instead of the cable motivation of the pusher ram 24, the trailer 38 may be equipped with fluid motivated, either hydraulic or pneumatic, ram means as shown in FIG. 7. For this purpose, a multi-section telescopic fluid operated plunger actuator 69 is mounted on the front end portion of the trailer and has a quick-disconnectable coupling means 70 by which it is adapted to be attached to the outer end of the pusher ram 24. Operation of the fluid actuated cylinder actuator 69 is adapted to be effected by fluid power supplied from the associated tractor through fluid lines 71 or from a fluid power source such as a pump, air compressor, or the like directly associated with the actuator on the trailer. Operation of the actuator 69 to drive the pusher ram 24 rearwardly will accomplish discharging or unloading of the container, while retraction of the actuator will effect return of the pusher to its forward bulkhead position.

When the container 10 has been returned to the loading site or discrete material source, the bulkhead pusher 24 having been returned to the front end of the container and the rear doors 31 closed and latched, one or both pairs of the top doors 19 are adapted to be opened into funnel relationship to the respective openings and material filled into the chamber 17 of the container. To improve the container load capacity, vertically operating tampers associated with the filling or loading apparatus may be inserted through the top openings 18 for compacting the material within the chamber 17. When the rear end portion of the chamber 17 becomes reasonably filled, the rearmost pair of the doors 19 may be closed and latched to prevent escape of material as additional material is compacted in the rear end portion of the chamber as received through the forwardmost opening 18.

Means may be provided for alternatively or in addition to or in cooperation with top loading of the container 10 effecting compaction by using the pusher ram 24 as a compactor at the loading site. For this purpose, means are provided for driving the pusher 24 as a compactor, comprising, for example, a fluid operated, such as pneumatic or hydraulic multi-section telescopic cylinder actuator 72 mounted on a suitable loading dock or platform base 73 and attachable disconnectably as by means of a thrust frame or plate 74 to the front end of the pusher 24. While the actuator 72 may be operative to drive the pusher 24 for compacting, where construction of the front end of the container is similar to that depicted in FIG. 4, the arrangement may be such that the pusher 24 can be entirely displaced from the front end of the container to enable dumping of material into its path from means such as a hoppered filling chute 75 operatively aligned with a supply source such as a conveyor or dump trucks operable from a dumping ramp or platform 77. For this purpose, the front end of the container 10 is operatively aligned with a ramp 78 having retaining side walls and rail extensions 80 aligned with the rails 30 on the upper face of the floor provided by the lower wall 11. Supports 80a mount the ramp 78 at a suitable elevation above the base 73. After attachment of the pusher to the actuator 72, it is adapted to be drawn out from the front end of the container by riding on the rails 80 into ample clearance relation to the front end opening to receive material from the chute 75. Periodically the pusher 24 is driven by the actuator 72 into the container to push the material thereinto. As the pusher passes the outlet from the chute 75 in the driving stroke means such as a closure slide 72a carried by the upper end of the thrust means 74 closes the outlet. When the container has been filled, the pusher is returned to and secured in its position in the front end portion of the container 10 and the ramp 78 is swung up into closing or at least inactive position in respect to the front end of the container.

Figure 9:
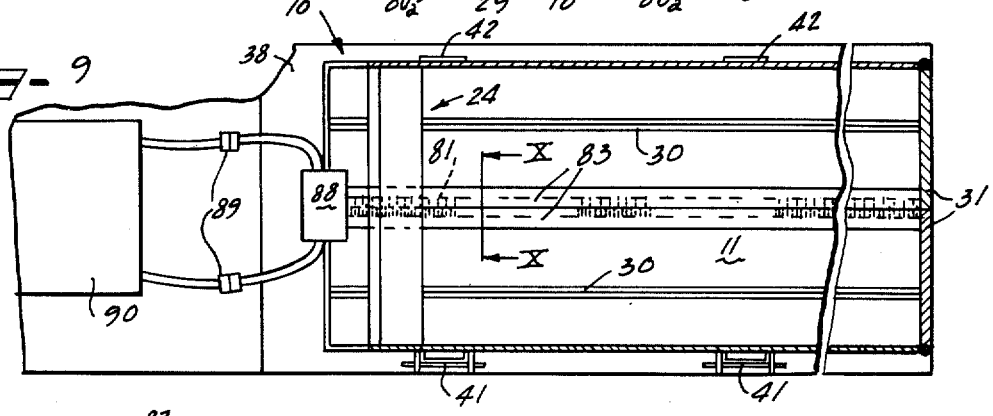
FIG. 9 illustrates a screw drive for the bulkhead ram.
Figure 10:
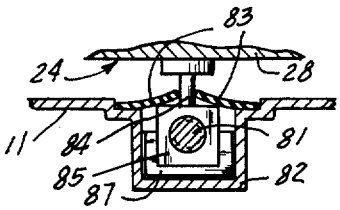
FIG. 10 is a fragmentary sectional detail view taken substantially along the line X—X of FIG. 9.

On reference to FIGS. 9 and 10, other means for operating the pusher 24 have been depicted, comprising a reversibly rotatable drive screw 81 mounted longitudinally centrally along the bottom wall 11 of the container 10. While the screw 81 may be mounted above the wall 11 it may be mounted on suitable bearings such as at its opposite ends within an upwardly opening groove of a channel 82 depressed below the floor surface of the bottom wall so that it can be closed over as by means of resiliently flexible cooperative sealing flange flaps 83 mounted therealong. Attached to the bottom edge of the pusher 24 as by means of a bracket 84 is a nut follower 85 threadedly engaged with the screw 81 so that rotation of the screw in one direction will cause the pusher 24 to be driven rearwardly while rotation of the screw 81 in the opposite direction will cause the pusher to be returned to the front end of the chamber 17 within the container. As the hanger 84 moves along the dirt seal flanges 83, it spreads them open in the immediate vicinity of the hanger and the flanges return automatically to their sealing relationship as the hanger passes any given point. When the rear doors 31 are open, the rear end of the groove in the channel 82 opens rearwardly and any liquids, or fine solids that may have gathered in the channel are discharged by the action of a scraper blade 87 which may be carried by the follower 85 and fits within the channel 82 against the bottom and side walls thereof to enable its purging action as the pusher 24 moves rearwardly to ram the container contents therefrom. In this arrangement the channel 82 may serve conveniently as a sump to receive liquids that may drain from the container contents. Driving of the screw 81 may be readily effected by means such as a hydraulic motor 88 connectable through quick disconnectable couplings 89 with a hydraulic pressure source 90 carried on the associated trailer, although other driving means may be employed if preferred. For operation by the compacting actuator 72, the pusher 24 may be disconnectable from the follower 85 or the follower bracket 84 in any suitable manner.

For maximum carrying capacity in refuse disposal hauling, the container 10 may have dimensions on the order of 20 to 25 feet in length, 8 to 10 feet in width and 12 to 14 feet in height.

Where loading dock platform facilities are unavailable at the container-loading site, it may be desirable to handle the containers by rolling them onto and from ground level relative to the conveyance. For this purpose, conventional roll-off equipment may be provided. At the dump site, of course, the advantageous horizontal discharge arrangement will be employed.

From the foregoing it will be apparent that this invention provides a highly efficient and economical system, and more particularly in a rail-haul system, for transporting discrete material such as refuse. The containers are relatively simple, large capacity, easily handled and have an efficient horizontal unloading device which does not require any power source on the container itself but is easily and quickly connectable to a driving device or power source *mounted on supporting structure such as a conveyance or dock or platform, and may be* carried by the dump site conveyance. Moreover, the same conveyance carrying the container and pusher motivating means is usable to haul a continuous succession of the filled containers and to return the empty containers to a loading site, dock or siding. Thereby the conveyance, which comprises the apparatus involving the largest capital investment, is used with maximum efficiency. At the same time cost of the containers is minimized, maximum usable space is provided in the containers, and dead load weight of the containers is reduced, because no powered motivating means need be carried by the containers.

It will be understood that variations and modifications may be effected without departing from the spirit and space of the novel concepts of this invention.

I claim as my invention:

1. The combination of a discrete material transporting and dumping apparatus and a supporting structure therefor, comprising:

a large capacity container having a bottom wall with opposite coextensive spaced side walls rising therefrom, a top wall, a front end and a rear end, and defining therein a discrete material receiving chamber;

means on said bottom wall for removably supporting the container on said supporting structure;

a forwardly and rearwardly reciprocable pusher structure in said chamber having a front side facing toward said front end and a rear side directed toward said rear end, with edges close to said bottom, side and top walls;

driving means mounted on said supporting structure; means for releasably connecting the pusher structure to said driving means for actuating the pusher structure reciprocably between said front and rear ends; closure door means at said rear end;

said pusher structure being operable by said driving means when the door means are open to discharge the material contents from said chamber through the open rear end; and means on said supporting structure to hold the container against displacement by reason of driving force of said driving means acting on said pusher.

2. Apparatus according to claim 1, in which said container is of substantial length, said top wall having longitudinally adjacent filling opening areas one of which extends to adjacent said rear end and the other of which extends to adjacent said front end, and closure means for at least said one opening area enabling closing of said one opening area when said chamber is substantially filled therebelow while the other opening area remains open to receive additional discrete material therethrough.

3. Apparatus according to claim 1, including means for withdrawing said pusher through the front end of said container to enable discharge of material into the container through said front end, and said driving means being operable to drive the pusher through said front end to compact the material within the container.

4. Apparatus according to claim 1, said driving means comprising a telescopic cylinder actuator releasably connectable to the front side of said pusher structure by said connecting means.

5. A combination according to claim 1, wherein said means on said bottom wall comprise rollers, and said supporting structure has channel tracks extending transversely relative to the reciprocal directions of movement of said pusher and cooperating with said rollers as said means to hold the container against displacement.

6. A combination according to claim 5, said tracks having means at respective opposite end portions thereof for retaining the rollers against unintentional rolling of the container transversely from said supporting structure.

7. A combination according to claim 6, said retaining means at one of the ends of said tracks comprising fixed stops.

8. A combination according to claim 6, said retaining means at one of the track ends comprising pivotal ramps adapted to be moved from the retaining position into cooperation with track means at one side of the supporting structure to enable rolling of the container from the supporting structure, and means for locking the ramps in raised retaining position relative to said tracks.

9. A combination according to claim 1, said driving means comprising a winch mounted on said supporting structure and including means for driving the winch, and respective cables connectible to the front and rear sides of said pusher structure for effecting the reciprocations of the pusher structure by operation of said winch.

10. A combination according to claim 1, said supporting structure comprising a conveyance for transporting the container from one site to another, the conveyance including a bed on which the container is received removably, said driving means comprising a winch operatively carried by the conveyance including a pair of cables and including means for removably attaching one of the cables to the front side of said pusher structure and means for detachably connecting the other of the cables to the rear side of the pusher structure whereby to enable reciprocation of said pusher structure by operation of the winch to effect pulling action and paying out of the respective winch cables alternately, and a cable idler pulley at the rear end of said conveyance to facilitate operation of said other cable.

11. A combination according to claim 1, including tracks extending transversely on said supporting structure under said bottom wall, rollers on said bottom wall riding said tracks, winch means carried by said supporting structure and having cables operatively connected therewith, and means on said bottom wall for attaching said cables for moving the container along said tracks by means of said cables in the operation of said winch means.

12. A combination according to claim 1, including means providing a forward ramp extension from said bottom wall, said pusher structure being movable out of said front end of said container, and said driving means being operable to withdraw the pusher structure from said front end of the container and also being operable to drive the pusher structure in compacting relation within the container structure towards said rear end.

13. A combination according to claim 12, said ramp being hinged along an edge to said bottom wall and being movable into upward closing relation to said front end of the container.

14. A combination according to claim 1, said driving means comprising a multi-section telescopic actuator.

15. A discrete material transporting and dumping apparatus comprising:

a large capacity container having a bottom wall with opposite coextensive spaced side walls rising therefrom, a top wall, a front end and a rear end, and defining therein a discrete material receiving chamber; means on said bottom wall for removably supporting the container on a supporting structure;

a forwardly and rearwardly reciprocable pusher structure in said chamber having a front side facing toward said front end and a rear side directed toward said rear end, with edges close to said bottom, side and top walls;

means for releasably connecting the pusher structure to conveyance-carried driving means by which the pusher structure is adapted to be driven reciprocably between said front and rear ends;

closure door means at said rear end;

said pusher structure being operable by said driving means when the door means are open to discharge the material contents from said chamber through the open rear end;

said closure door means comprising a pair of door members respectively hinged vertically along the adjacent ends of said side walls and including means for latching them in closed position; and a leakage preventing barrier cooperating with said door members along the rear end of said bottom wall and movable into a non-obstructing position when the door members are open to facilitate discharge of said material contents from said chamber through said open rear end.

16. Apparatus according to claim 15, said barrier comprising a flexible gasket member intermediately hinged along a horizontal line with a base portion secured to said bottom wall adjacent to said rear end and having a portion extending upwardly along the lower portion of said closure door means in the closed condition of the door means but swingable downwardly and outwardly when the door means are opened for dumping container contents.

17. A discrete material transporting and dumping apparatus comprising;

a large capacity contaner having a bottom wall with opposite coextensive spaced side walls rising therefrom, a top wall, a front end and a rear end, and defining therein a discrete material receiving chamber;

means on said bottom wall for removably supporting the container on a supporting structure;

a forwardly and rearwardly reciprocable pusher structure in said chamber having a front side facing toward said front end and a rear side directed toward said rear end, with edges close to said bottom, side and top walls;

means for releasably connecting the pusher structure to conveyance-carried driving means by which the pusher structure is adapted to be driven reciprocably between said front and rear ends;

closure door means at said rear end;

said pusher structure being operable by said driving means when the door means are open to discharge the material contents from said chamber through the open rear end;

said pusher structure including a vertical front frame and a rearwardly facing plate extending diagonally downwardly and forwardly from the upper edge of said frame and joined at its bottom edge to the bottom edge of the frame by an integral dolly having a plurality of generally V-grooved rollers aligned in front to rear spaced relations between said bottom edges; and rails on the upper face of said bottom wall running longitudinally therealong and engaged by and within the V-grooves of said rollers for running therealong in the reciprocations of the pusher structure.

*18. A method of transporting and dumping solid discrete material, comprising:*

*at a loading site filling a large capacity material-receiving chamber within a container with discrete material, said container having a mobile pusher at one end of the chamber and an opposite unloading end of the chamber provided with an opening defined by the unloading ends of the chamber walls, and selectively operable closure door means closing the opening;*

*transferring the container to a dumping site;*

*positioning the container so that the pusher end is adjacent to and in alignment with a pusher driving means mounted separately and independently of the container on a supporting structure;*

*releasably connecting said separate and independent pusher driving means to said mobile pusher;*

*opening said closure door means for discharge of the material through said unloading end opening;*

*activating the driving means to apply thrust force to said pusher and thereby moving the pusher in said chamber toward said unloading end opening and ejecting the discrete material load contents from the chamber;*

*holding the container against displacement relative to said supporting structure and said driving means as the thrust force is applied to the load contents by the pusher;*

*after ejection of said load contents releasing said driving means from the pusher; and*

*transferring the container away from said driving means.*

*19. A method according to claim 18, including reversing the pusher driving means at the dumping site and returning the pusher to the said one end of the container chamber, releasing said pusher driving means from said pusher, closing said closure door means, and transferring said container to a loading site.*

*20. A method according to claim 19, including, at the loading site connecting said pusher releasably to driving means mounted independently of the container on supporting structure and located in alignment with the pusher end of the container, loading compactible discrete material into the container, operating said driving means and thereby moving said pusher toward the closed door means to compact the compactible material in the container chamber, then releasing said loading site driving means from the pusher, and transferring the container to a dump site with said pusher serving as a bulkhead at said pusher end.*

*21. A method according to claim 18, including closing said closure door means, returning the container to a loading site, at the loading site connecting said pusher releasably to driving means mounted independently of the container on supporting structure and located in alignment with the pusher said one of the container chamber, operating said loading site driving means to withdraw the pusher from the container chamber through said one end, supplying compactible discrete material into filling relation between the pusher and said pusher end, actuating said loading site driving means and thereby moving the pusher to compact the supplied discrete material in the container chamber, then releasing said loading site driving means from the pusher, and transferring the container to the dump site with said pusher serving as a bulkhead at said one end.*

*22. A method according to claim 18, comprising closing said closure door means, releasably connecting the pusher to driving means on supporting structure at the loading site adjacent to and separate from said one end of the container, loading compactible discrete material into the container chamber through the top thereof, operating the driving means to actuate the pusher and compact the discrete material in the container toward said closure door means, releasing said loading site driving means from said pusher, and then transferring the container to the dumping site with said pusher serving as a bulkhead at said one end.*

* * * * *